Feb. 27, 1968   W. P. BANKS ET AL   3,371,023
METHOD AND APPARATUS FOR AUTOMATICALLY REGULATING
THE PASSIVATION POTENTIAL OF METALS
Filed May 7, 1964   3 Sheets-Sheet 1

INVENTORS
WILLIAM P. BANKS,
RICHARD L. EVERY &
NORMAN L. CONGER
BY
*William C. Miller*
ATTORNEY

INVENTORS
WILLIAM P. BANKS,
RICHARD L. EVERY &
BY  NORMAN L. CONGER

ATTORNEY

United States Patent Office 3,371,023
Patented Feb. 27, 1968

3,371,023
METHOD AND APPARATUS FOR AUTOMATI-
CALLY REGULATING THE PASSIVATION
POTENTIAL OF METALS
William P. Banks, Richard L. Every, and Norman L. Conger, Ponca City, Okla., assignors to Continental Oil Company, Ponca City, Okla., a corporation of Delaware
Filed May 7, 1964, Ser. No. 365,621
13 Claims. (Cl. 204—147)

This invention relates to a method and apparatus for automatically adjusting the passivation potential of a metallic member which is under protection against corrosion using an anodic polarization corrosion control system. More particularly, the present invention relates to a method of automatically regulating the control potential or "set-point" of anodic polarization corrosion control systems so other control may be automatically maintained despite changes in the chemical and physical character of the environment of the metallic specimens under protection.

As it is well known in the art of corrosion control, the corrosion of many metals may be prevented or largely reduced by inducing passivity in the metal by anodic polarization techniques. Recently, a method and apparatus for corrosion prevention by means of anodic polarization has been developed wherein a metallic specimen, such as a vessel to be protected against corrosion by a chemical contained therein, is anodically polarized with respect to an inert electrode suspended in the corrosive electrolyte in the vessel. An electrical current is passed between the metallic vessel and the inert cathode in a manner such as to maintain the electrical potential of the vessel in a so-called passive region, that is, a potential range in which the rate of corrosion of the vessel is minimized. The magnitude of the current which is applied between the vessel and the inert cathode is at all times determined by the potential of the metallic vessel, with the current being varied as necessary in order to maintain the potential of the vessel in the region of passivity. The electrical potential values at which the vessel is least susceptible to corrosion when subjected to contact with a particular electrolyte at a particular concentration and temperature may be determined by developing a polarization curve characteristic of the metal when the metal is in contact with the particular electrolyte at such temperature. The polarization curve is, of course, a curve in which the potential difference between the vessel and a reference electrode of constant potential is plotted against current density. The passive region on an anodic polarization curve can be easily identified and provides data indicative of the potential range within which the vessel should be maintained in order to achieve a maximum reduction in corrosion.

In the commercial systems which have been developed for protecting a metallic member by anodic polarization procedures, a reference electrode of constant potential is placed in electrical communication with the corrosive electrolyte contacting the metallic member, and the potential difference between such reference electrode and the metallic member is constantly monitored. This potential difference, which may be termed the reference potential, $V_r$, is continuously compared electrically with a second potential called the control potential, $V_c$. The control potential $V_c$ is the potential difference which, according to polarization curve data, must exist between the metallic member and the reference electrode if the vessel is to be maintained in a passive state. The continuous electrical comparison of the reference potential $V_r$ with the control potential $V_c$ results in the continuous generation of an error voltage $V_e$ which provides a signal usable to increase or decrease the amount of current passed between the metallic member and the inert cathode suspended in the electrolyte. In other words, the reference potential $V_r$ is constantly monitored, and the anodic corrosion control system functions to develop an error signal in the manner described to constantly maintain the metallic member at a passive potential.

In anodic polarization control systems of the type described, no difficulty is generally encountered in the proper functioning of the system as long as the control potential $V_c$ which must be set into the system for comparison with the reference potential $V_r$ is of a constant or a unitary value. This will generally be the case where the corrosion control system is to be used in protecting a metallic vessel or the like against corrosive attack by a single type of electrolyte at a fairly constant concentration and at a constant temperature. Where one corrosive electrolyte is replaced by another, however, or where the temperature of the electrolyte is varied substantially, or its concentration changed sharply, it is then necessary to introduce a different control potential $V_c$ into the system so that the reference potential $V_r$ may be compared to such different control potential and brought into correspondence with it by the system through the passage of a current of different magnitude between the vessel and the inert cathode. In other words, for different sets of corrosion conditions obtaining with a given metallic vessel, different ranges of passive potential will characterize the metal and therefore a different control potential must be compared with, and balanced against, the reference potential actually developed between a reference electrode of constant potential and the vessel.

It has heretofore been customary, in situations where a change in the system under protection requires the development of a different reference potential, to manually set the new control potential into the system by manual adjustment of a potentiometer, or some other manual manipulation. Such procedure is, of course, time consuming and requires the attention of operating personnel.

The present invention provides a method and apparatus for automatically adjusting the control or "set-point" potential $V_c$ employed in an anodic polarization corrosion control system so that corrosion protection can be maintained despite substantial changes in the chemical and physical environment of the metal specimen under protection. Broadly, the method employed for automatically regulating the control potential of the corrosion control system comprises sensing the potential difference developed between two electrodes immersed in, or in electrical communication with, the corrosive electrolyte, and then, in response to changes in such potential difference occasioned by variations in the chemical or physical environment of the metal to be protected, automatically adjusting the control potential $V_c$ to bring such control potential within the passive potential range for the metal under the new conditions which obtain.

The apparatus which is employed in practicing the method of the present invention comprises a conventional anodic polarization corrosion control system which includes an inert cathode, a reference electrode of constant electrical potential for monitoring the changing potential of the metal specimen to be protected, an electrical current supply for passing current between the metal specimen and the inert cathode, and an electrical or electronic potential control system for comparing a selected control or "set-point" potential with the reference potential developed between the reference electrode and the metal specimen. On the basis of differences between these potentials, the current passed between the metal specimen and the inert cathode is adjusted to maintain the vessel in a range of passive potential characteristic of the system. In addition to these elements which are conventionally used in anodic polarization corrosion control systems, the apparatus of the present invention further includes (a) at least one additional sampling electrode, (b) means for sensing the potential difference, hereinafter termed the error potential, between said one additional sampling electrode and another reference electrode (which may be the same reference electrode used in the anodic polarization corrosion control system for obtaining the reference potential, or may be a different electrode), and (c) means responsive to changes in the error potential as thus sensed to automatically introduce a new control or "set-point" potential into the corrosion control system.

In one embodiment of the invention, the apparatus functions to reset or adjust the control potential (set-point) of the corrosion control system to two or more values on an intermittent or discontinuous basis. In another embodiment of the apparatus of the invention, the set-point of the corrosion control system is continuously adjusted in response to a continuous change in the potential developed between the two electrodes.

From the foregoing description of the invention, it will have become apparent that a major object of the invention is to provide a method and apparatus for automatically adjusting the passivation potential of a metallic member so as to maintain such metallic member in a protected state against corrosion by a corrosive electrolyte despite changes in the chemical and physical environment of the metal.

A more specific object of the present invention is to automatically adjust the set-point of an anodic polarization corrosion control system in response to chemical or physical conditions which change the electrical potential range over which the metal demonstrates the greatest resistance to corrosion.

Another object of the present invention is to provide an improved anodic polarization corrosion control system for protecting a metallic vessel or the like against corrosion.

A further object of the present invention is to provide an apparatus for automatically regulating the control potential or set-point of an anodic polarization corrosion control system, which apparatus is relatively simple in construction, and is characterized by a long and durable service life.

In addition to the foregoing objects and advantages of the invention, additional objects and advantages will become apparent as the following detailed description of the invention is read in conjunction with the accompanying drawings which illustrate the invention.

Figure 1:
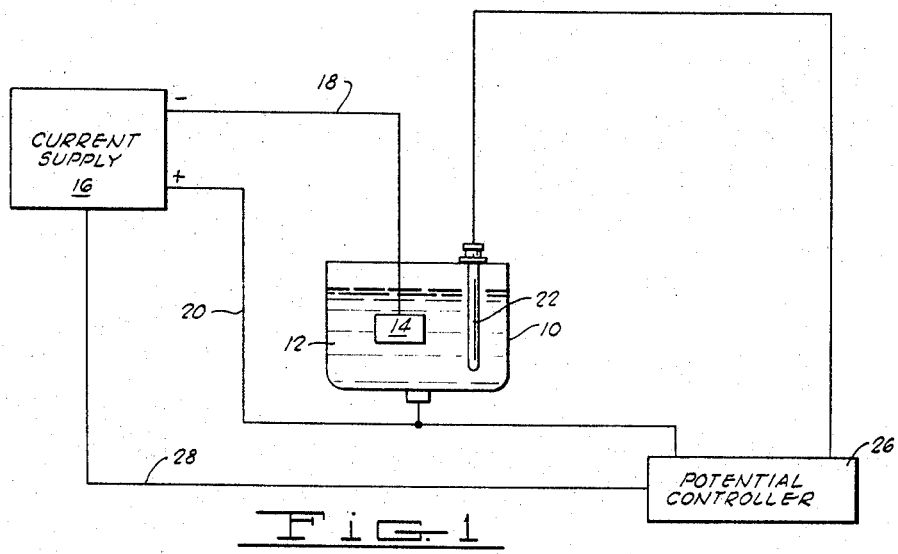
FIGURE 1 is a schematic wiring diagram of a conventional anodic polarization corrosion control system.

Referring now to the drawings in detail, and particularly to FIGURE 1, a typical application of an anodic polarization corrosion control system is illustrated. This application contemplates the protection against corrosion of a metallic vessel 10 used to contain a corrosive electrolyte 12, such as sulfuric acid, sodium hydroxide or the like. An inert electrode 14 is suspended or otherwise supported in the corrosive electrolyte 12 and is connected to the negative side of a source 16 of direct current by the conductor 18. The inert cathode 14 may be constructed of any material which is inert to the electrolyte 12 and resists changes in potential as a current is passed therethrough, i.e., a material which does not corrode. In most instances, platinum is a suitable material of construction.

The positive side of the direct current source 16 is connected by a conductor 20 to the vessel 10. It will thus be seen that the vessel 10 functions as an anode, and that the inert electrode 14 functions as a cathode.

As is now well understood in the art, the rate of corrosion of the vessel 10 will vary with the electrical potential of the vessel, and the corrosion characteristics of the vessel are reflected by its polarization curve obtained in the manner hereinbefore described and well understood in the art. A polarization curve of the metal of which the vessel is constructed will thus indicate that over a certain range of electrical potential, the vessel will undergo a minimum of corrosion or attain a passive state. In order to be constantly apprised of the vessel's electrical potential, a reference electrode 22 of constant electrical potential is placed in electrical communication with the corrosive electrolyte 12, and the potential difference (hereinafter termed the reference potential, $V_r$) between the reference electrode and the vessel is continuously measured. A silver-silver chloride solid electrode may suitably be used as the reference electrode 22, and when employed, is placed directly in electrical communication with the corrosive electrolyte. An alternative electrode could be the standard calomel half cell, a liquid electrode. In certain applications this electrode would prove advantageous over the solid-type electrode.

When the vessel 10 is made the anode of an electrochemical cell, the potential of the vessel shifts in the more noble direction. When this shift is of proper magnitude, the corrosion stops and it is said that the vessel 10 has become passive. In this connection, it should be noted that the sign of the potential difference between the vessel 10 and the reference electrode is of no consequence insofar as the nobility (the relative position in the E.M.F. table of the vessel) is concerned, i.e., the sign of this potential difference may be positive or negative or changed as the vessel is made less susceptible to corrosion. After the potential of the vessel has been shifted into the passive range, the quantity of current passed between the vessel and the inert cathode may be substantially reduced, and only a small amount of current passed between these elements in order to maintain the vessel in the passive range.

In the arrangement depicted in FIGURE 1, in order to measure and control the potential of the vessel 10, a potential controller 26 is connected between the reference electrode 22 and the vessel 10. Various types of potential controllers can be employed for measuring and controlling the potential of the vessel 10, but one which has been found to be especially useful in the present invention is shown in greater detail in FIGURES 2 and 3, and will be more specifically described hereinafter. It will suffice at this point in the description of the invention to point out that the potential controller 26 functions to constantly monitor the reference potential $V_r$ between the reference electrode 22 and the vessel 10, to compare this reference potential $V_r$ with a control potential $V_c$ which is predetermined from polarization curves and set into the potential controller 26 and to develop an error signal $V_e$ based on such comparison. The error signal $V_e$ thus developed is transmitted via the conductor 28 to vary the amount of current from the source 16 which is passed between the inert cathode 14 and the vessel 10. The variation in the current thus passed through the system is such that the reference potential $V_r$ is continuously matched or brought into agreement with the control potential $V_c$ so that the potential of the vessel is maintained at a passive potential.

In the foregoing discussion, the operation of the anodic corrosion control system incorporated in the combination of the system of the present invention has been generally described and no attempt has been made to describe specific details of this structure. This information is within the knowledge of those skilled in the art, constitutes no part of the present invention except as used in combination with the structure hereinafter described, and may be better understood by referring to copending application for U.S. Letters Patent Serial No. 1,135 filed Jan. 7, 1960, now Patent No. 3,127,337, and assigned to the assignee of the present invention.

Figure 2:
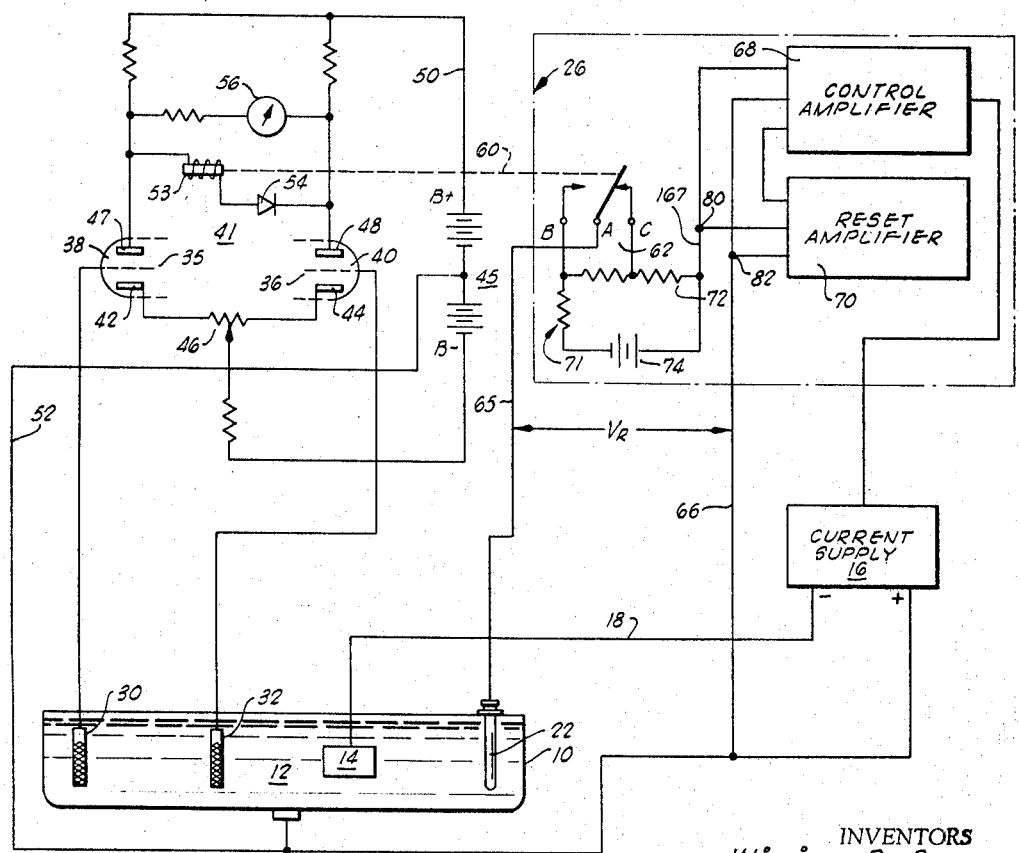
FIGURE 2 is a schematic wiring diagram of one embodiment of the apparatus of the present invention.

Referring next to FIGURE 2 of the drawings, the illustrated embodiment of the invention includes, in combination with the anodic polarization control system shown in FIGURE 1 and hereinbefore described, means for automatically adjusting the control potential $V_c$ which is set into the potential controller 26 in response to variations in the chemical and/or physical environment of the metal vessel under protection. The means for automatically adjusting the reference potential comprises a pair of sampling electrodes 30 and 32 which are each characterized in having a substantially constant potential under fixed conditions of electrolyte temperature, concentration and chemical composition. The sampling electrodes 30 and 32 are selected so that as one of the conditions of the system changes, the potential difference between the two sampling electrodes 30 and 32 also undergoes a measurable change. For example, if sulfuric acid were initially contained in the vessel 10, and it were desired to replace the contents of the vessel 10 with a different corrosive electrolyte, such as phosphoric acid, the electrodes 30 and 32 would be selected so that upon changing the electrolyte in the manner described, the potential difference between the electrodes 30 and 32 would not remain constant, but would change in a marked manner susceptible to monitoring or measurement. Although in some embodiments of the invention, operation of the system could be effected using only a single sampling electrode in addition to the reference electrode 22 used in the anodic polarization corrosion control system, it is preferred to use the two additional sampling electrodes 30 and 32 since the system is thereby given greater versatility. Also, the set-point or control potential $V_c$ needed for a particular system may be set into the potential controller prior to the time the corrosion control system is placed in use by placing the reference electrode 22 in electrical communication with the electrolyte. The sampling electrodes 30 and 32 can each be solid electrodes, such as a gold-gold oxide, or a chromium carbide electrode, and in this event may be immersed directly in the corrosive electrolyte as shown in FIGURE 2. The electrodes can also be solid-liquid electrodes, such as the standard saturated calomel electrode, in which case it may be preferable to place the electrodes 30 and 32 in communication with the electrolyte through the instrumentality of a salt bridge, well-known in the art. In one embodiment of the invention, for example, a gold-gold oxide electrode and a saturated calomel electrode can be used as the sampling electrodes 30 and 32. The potential differences which are developed between these two sampling electrodes (30 and 32) in several different types of electrolyte are tabulated in Table I.

TABLE I

| Electrolyte: | E.M.F. in millivolts between sampling electrodes |
|---|---|
| 67% $H_2SO_4$ | −360 |
| 20% NaOH | +650 |
| 85% $H_3PO_4$ | −80 |

The electrodes 30 and 32 are connected by conductors 33 and 34, respectively, to the grids 35 and 36, of a pair of triodes 38 and 40, respectively, used in a direct current differential amplifier 41. Current is applied through a variable resistor 46 to the cathodes 42 and 44 of the triodes 38 and 40 from a source of electromotive force 45. The plates 47 and 48 of the triodes 38 and 40, respectively, are connected to the other side of the source of electromotive force 45 by an electrical conductor 50, and the metallic vessel 10 is also connected to the source of the E.M.F. by an electrical conductor 52.

The DC differential amplifier 41 is sensitive to the development of voltage differences between its grids 35 and 36. Thus, when a change in the potential difference between the sampling electrodes 30 and 32 occurs, an unbalance of the voltages of the grids 35 and 36 results and an output signal is developed by the differential amplifier 41. The output of the DC differential amplifier 41 is applied to a relay 53 connected across the plates 47 and 48. A diode 54 is connected in series with the relay coil to prevent ambiguous signals from causing the relay 53 to operate. The sampling electrodes 30 and 32 and the diode 54 must obviously be connected in the proper sequence in order to provide for actuation of the relay 53 at the desired time.

A suitable meter, such as a milliammeter 56, may also be connected across the plates 47 and 48 of the triodes 38 and 40 to give direct indication of the manner in which the potential difference between sampling electrodes 30 and 32 undergoes change as the changing physical and chemical environment of these electrodes is changed.

If it should be desired to amplify the change of potential difference between the sampling electrodes 30 and 32 by a greater degree than that which is possible using the single DC differential amplifier 41, additional stages of amplification can be incorporated in the system in accordance with techniques well understood in the art. Also, in most instances, it will be desirable to prevent energization of the relay 53 until a certain magnitude of change in potential difference has occurred between the electrodes 30 and 32. This adjustment can be made with the potentiometer 46 to purposely unbalance the amplifier by the requisite amount. If desired, however, the amount of current which is required to actuate the relay may be controlled by the use of suitable resistors placed in series with the relay, and across the plates 47 and 48 of the triodes 38 and 40.

The relay acts through a suitable mechanical linkage 60 to cause closure of contacts AC or AB of switch 62. As illustrated in FIGURE 2, the switch may be made to normally occupy the status in which contacts A and C are closed, with the relay 53 functioning to shift the movable element of the switch into a position in which contacts A and B are closed. The movable contact A of switch 62 is connected by a conductor 65 to the reference electrode 22 used in the anodic polarization corrosion control system. The metallic vessel 10 is connected by an electrical conductor 66 to a control amplifier 68 and reset amplifier 70. The total voltage across the reference electrode 22 and the vessel 10 is the reference potential $V_r$ hereinbefore described and indicated in FIGURE 2.

A set-point control device 71 is utilized for changing the control potential $V_c$ set into the potential controller 26, and in one embodiment comprises a voltage divider 72 and a battery 74. The contacts B and C of the switch 62 are connected to spaced points on the voltage divider 72 so that the desired control potential $V_c$ which is to be matched or compared with the reference potential $V_r$ is determined by the position of the movable element of the switch 62. The control potential $V_c$ is thus the potential developed between the end of the voltage divider which is connected to the positive terminal of the battery 74 and either the contact C or B of the switch 62, depending upon the position of the switch. In other words, two different control potentials $V_c$ may be selectively developed by the set-point control device 71, and the reference potential $V_r$ compared, and brought into agreement, with one of these control potentials in the manner hereinafter described. The battery 74 used in the set-point control device 71 is a stable battery, such as a mercury cell battery, in order to provide the minimum fluctuation of the control potential $V_c$.

The reference electrode 22 and the metallic vessel 10 are connected to the set-point control device 71 so that the reference potential $V_r$ is bucking the control potential $V_c$ developed by the battery 74 to provide an error voltage across terminals 80 and 82 equal to $V_r - V_c$. This error voltage or signal may be referred to as $V_e$, and it will be understood that $V_e$ may be either positive or negative. The degree of variation of the reference potential $V_r$ is continuously indicated by the error voltage $V_e$. In the ideal case, $V_e$ is zero and $V_r$ equals $V_c$. The error signal $V_e$ is applied to both the control amplifier 68 and the reset amplifier 70, for the purpose of developing a control signal which may be used to vary the current developed by the current supply.

Figure 3:
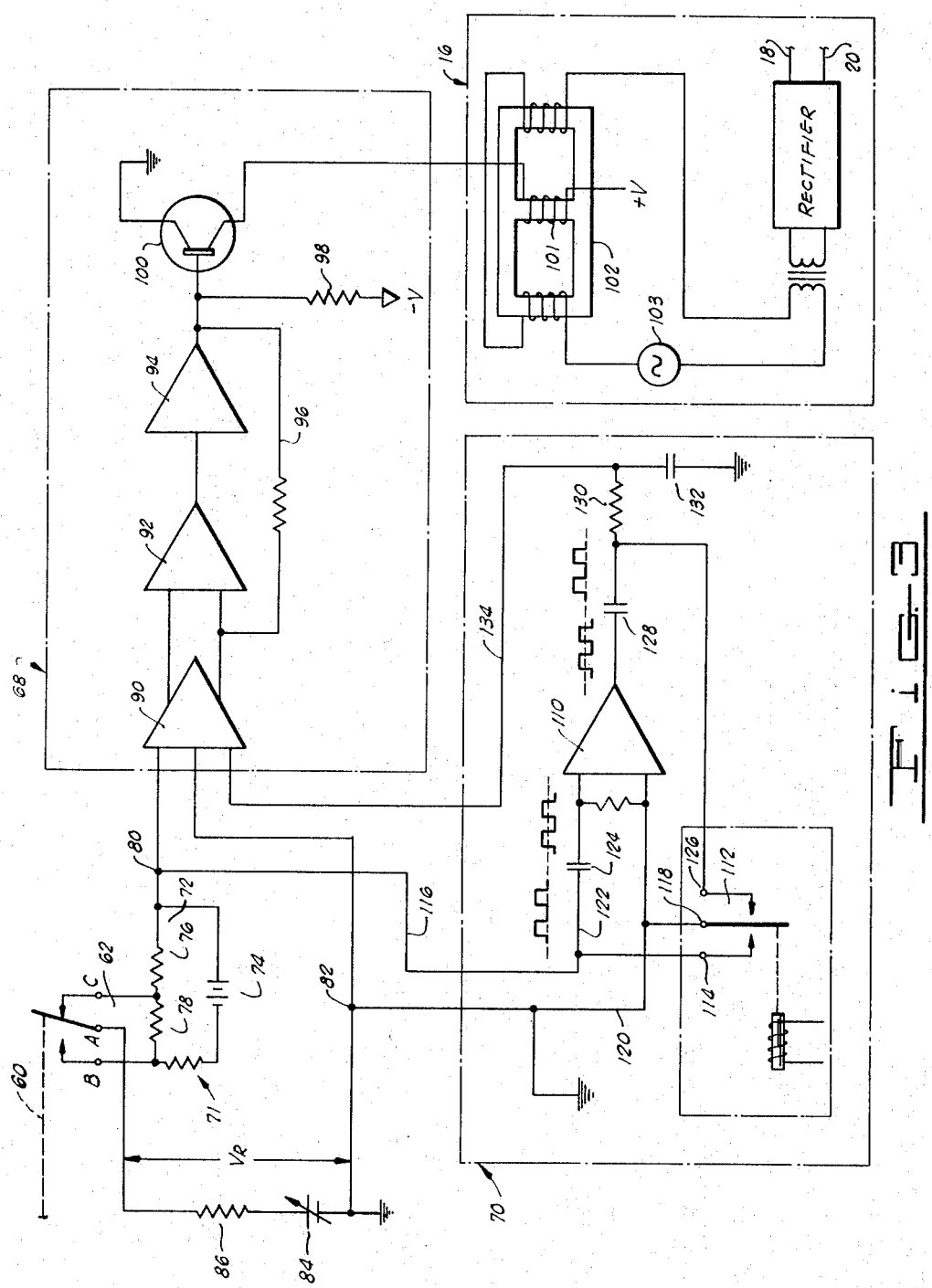
FIGURE 3 is a schematic wiring diagram illustrating in greater detail, the elements of a potential controller and current supply which can be used in the present invention.

A control amplifier 68, reset amplifier 70 and current supply 16 which can be advantageously used in the system of the present invention are illustrated in greater detail in FIGURE 3. For convenience of illustration in FIGURE 3, the reference potential $V_r$ which is developed between the reference electrode 22 and the vessel 10 is illustrated by an ideal battery 84 provided with an arrow to indicate that the reference potential varies. A resistor 86 is connected in series with the potential source 84 to represent the normal resistance of the electrolyte between the reference electrode 22 and the vessel 10, and giving rise to the reference potential $V_r$. As illustrated in FIGURE 3, the error voltage $V_e$ appearing across the terminals 80 and 82 is impressed on one grid of a differential amplifier 90 of the control amplifier 68 to provide a first stage of voltage amplification. The amplified output of the differential amplifier 90 is impressed on a second differential amplifier 92 to provide a second stage of voltage amplification. Both of the differential amplifiers 90 and 92 are, of course, DC amplifiers and provide voltage amplification. The output of the differential amplifier 92 controls the operation of a cathode follower 94 which provides power amplification of the error signal. It will also be noted that a feedback loop 96 extends from the output of the cathode follower 94 to the input of the differential amplifier 92 to reduce the net gain of the control amplifier 68 to maintain stability of operation.

The output of the cathode follower 94 appearing across the cathode resistor 98 may be designated as the "control signal" which is impressed on the base of a PNP transistor 100. The collector of the transistor 100 is connected to ground and the emitter of the transistor is connected to a suitable current control device, such as the control winding 101 of a saturable core reactor 102. Since the transistor 100 will conduct when the base thereof is more negative than the emitter, the amount of current flowing through the control winding 101 of the saturable core reactor 102 used to control the current will increase as the control signal goes in a negative direction and vice versa. For example, a negative error signal will decrease the positive potential of the base of the transistor 100 to increase the amount of current flowing through the control winding of the saturable core reactor, which would thus increase the power supplied to the vessel 10 and inert cathode 14.

The saturable core reactor 102 is connected to an AC power supply 103 and to a transformer 104. The output from the transformer 104 is rectified by a suitable rectifier 106 and the direct current thus developed is passed between the vessel 10 and inert cathode 14 as illustrated in FIGURES 1 and 2. It should be understood that in certain applications the saturable reactor current control device may be replaced by other current control elements which are known in the art. In particular, when size and weight become determining factors, the silicon controlled rectifier and other solid state devices offer very good current control capabilities.

The control amplifier 68 has a fast response compared with the response of the saturable core reactor 102. Thus, the gain of the control amplifier 68 must be limited to prevent "hunting" or oscillation of the saturable core reactor. In other words, the effect of rapid vibrations in the error signal would be immediately applied by the control amplifier 68 on the control winding 101 of the saturable core reactor 102; however, the saturable core reactor 102 will not respond simultaneously with such rapid variations in the error signal, and would constantly change to catch up with the changing error signal which changes would in turn provide new error signals. The reset amplifier 70 is therefore provided to obtain the desired gain only upon sustained variations in the error signal, as well as to overcome the effects of drift in the DC amplifiers included in the control amplifier 68.

The reset amplifier 70 basically comprises an AC amplifier 110 and a chopper 112. The error signal appearing across the terminals 80 and 82 is impressed on the chopper 112 by connecting the terminal 80 to the stationary contact 114 of the chopper by a conductor 116, with the terminal 82 being connected to the movable contact 118 of the chopper by a conductor 120. Thus, a pulsating DC is provided in the conductor 122 connecting the conductor 116 with the amplifier 110. A condenser 124 is interposed in the conductor 122 to convert the pulsating DC to a substantially square wave AC which is in turn amplified by the amplifier 110 at a gain of, for example, 130. The square wave output of the amplifier 110 is coupled to another stationary contact 126 in the chopper 112 through a condenser 128 to convert the square wave to a pulsating DC signal which is 180° out-of-phase with the signal fed to the amplifier 110.

The resulting pulsating DC signal is subjected to a low pass filter comprising a resistor 130 and a condenser 132 to provide an amplified error signal in the conductor 134 having a polarity opposite to the polarity of the original error signal appearing across the terminals 80 and 82. The modified error signal in conductor 134 is applied to another grid (not shown) of the differential amplifier 90 of the control amplifier 68. It will thus be seen that the output of the differential amplifier 90 comprises an amplification of the difference between the original error signal appearing across the terminals 80 and 82, and the modified error signal produced by the reset amplifier 70 and passed into the differential amplifier 90 via the conductor 134.

The low pass filter (resistor 130 and capacitor 132) which is used in producing the modified error signal has a relatively long time constant, such as a 0.02 cycle per second, to minimize the rate of variation of the modified error signal compared with the variations in the original error signal. In other words, the original error signal must persist at a given amplitude for an appreciable period of time before there is a change in the modified error signal produced by the reset amplifier 70. Since the modified error signal is subjected to substantially more amplification than the original error signal, the modified error signal will have a major control on the amplitude of the control signal applied to the base of the transistor 100 during sustained variations in the error signal. Variations in the original error signal of short time duration will have a minor effect on the amount of current flowing through the control winding 101 of the saturable core reactor 102 and will not cause the reactor to "hunt."

Prior to discussing the modified embodiments of the invention illustrated in FIGURES 4 and 5 of the drawings, the operation of the embodiment shown in FIGURES 2 and 3 and described hereinbefore will be described.

OPERATION

Let it be assumed that it is desired to protect against corrosion a metallic vessel 10 which is used at different times for the purpose of containing two different corrosive electrolytes, one of which is shown in the vessel and is designated by reference numeral 12. The system of the invention is then installed with the insert cathode 14 and reference electrode 22 and two sampling electrodes 30 and 32 of substantially constant potential in electrical communication with the electrolyte 12. In the context of usage in this application, the "constant potential" characteristic of the reference electrodes refers to their ability to maintain a substantially constant potential relative to a fixed known standard, such as the hydrogen electrode, under unvarying conditions of electrolyte concentration, temperature and pressure. As previously indicated, the sampling electrodes 30 and 32 are selected so that as some physical or chemical property of their environment changes, the potential difference between the two electrodes which exists prior to such change, also undergoes a change of measurable magnitude and in a predictable and repeatable manner.

As is well understood in the art, if a first corrosive electrolyte 12 be replaced by a second electrolyte of different concentration or chemical properties, the electrical potential of the vessel 10 at which the vessel is characterized by maximum resistance to corrosion is changed. It is thus necessary, when using an anodic polarization corrosion control system, to vary the amount of current passed between the vessel 10 and the inert cathode 14 by an amount which will bring the potential of the vessel 10 into the range of passive potential for the new electrolyte.

To automatically effect a change in the control characteristics of the anodic polarization corrosion control system in order to adjust the potential of the vessel 10 as required for passivity with respect to the new electrolyte, variations or changes in the electrical potential between the sampling electrodes 30 and 32 are continuously monitored or detected, and a control signal is generated when such change becomes of sufficient magnitude. By connecting the electrodes 30 and 32 to the grids 35 and 36 of the differential amplifier 41, an output signal may be developed by the amplifier 41 when the voltages on the grids become unbalanced to a predetermined degree. The output signal of the amplifier 41 is passed through the coil of relay 53 to energize the relay and throw the switch 62 through the instrumentality of the mechanical linkage 60.

Prior to its actuation by the relay 53, the switch 62 has been in one status of closure so that one of two set-points available from the set-point device 71 has previously been in use to develop a control potential $V_c$ which is compared and matched with the reference potential $V_r$ developed between the reference electrode 22 and the vessel 10. When the switch 62 is shifted by the relay 53, the second set-point available from the set-point device 71 comes into use, and a second control potential $V_c$ is made to buck the reference potential $V_r$, to develop a different control signal applied to the control winding 101 of the saturable core reactor 102 in the manner hereinbefore described. The current supply 16 thus develops a different current output which is passed between the vessel 10 and the inert cathode 14. The potential of the vessel 10 is thus changed as may be necessary to reduce to a minimum the susceptibility of the metallic vessel to corrosive attack by the new electrolyte.

Figure 4:
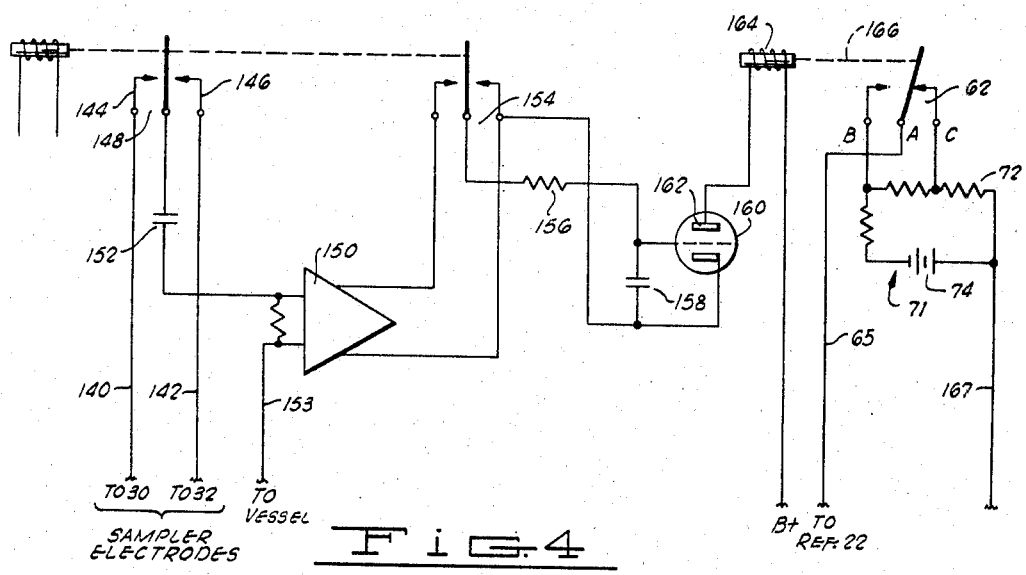
FIGURE 4 is a schematic wiring diagram of a second embodiment of the present invention.

Prior to proceeding to a description of the embodiment of the invention illustrated in FIGURE 4, it should be pointed out that where a selection of more than two set-points is required, as in the case of a process where a plurality of electrolytes are to be placed in the vessel 10, or where the electrolyte is to be changed several times in either concentration or temperature, the relay 53 illustrated in FIGURE 2 can be replaced by a stepping switch having many contacts. An appropriate electrical circuit capable of emitting impulse type signals in response to changes in the potential difference between the electrodes 30 and 32 is then substituted in the circuitry of FIGURE 2 in place of the differential amplifier 41 to cause the stepping switch to change positions as the physical or chemical environment of the sampling electrodes 30 and 32 undergoes a sequence of changes.

Another modification of the invention is illustrated in FIGURE 4. As in the case of the system illustrated in FIGURE 1, the FIGURE 4 system portrays a means for selectively adjusting a control potential to select one of two possible set-points or control potentials, but utilizes a more stable type of electrical circuit than that which is portrayed in FIGURE 1. Conductors 140 and 142 are connected to the sampling electrodes 30 and 32, respectively, (not shown) and to the stationary arms 144 and 146 of a chopper type converter 148. The converter 148 alternately connects each of the arms 144 and 146 to an AC amplifier 150 through a capacitor 152. The vessel 10 is connected to the amplifier 150 by a conductor 153. A square wave AC signal is thus developed whose amplitude is directly proportional to the DC signal difference between the two sampling electrodes 30 and 32. The AC amplifier 150 is selected to have a dynamic range of signals so as not to saturate either reference for the two different chemical or physical conditions for which different set-points or control potentials $V_c$ are to be introduced to the system. The AC amplifier 150 imparts to the square wave AC signal a predetermined amount of amplification.

The resulting amplified signal is then passed to a second chopper type converter 154 which is mechanically ganged to the converter 148 so as to produce a DC output signal with a direct phase relationship to the input signal. That is, a positive going input results in a positive going output or vice versa, whichever relationship is most desirable. The DC signal from the chopper type converter 154 is passed through a filter comprising resistor 156 and capacitor 158 and is applied to a triode amplified tube 160. The amplifier tube 160 has its plate 162 connected to the coil of a relay 164 and the overall circuit is adjusted so that the amplifier 160 is saturated in its "on" or conducting state, and is biased beyond cut-off in its "off" state. When the circuitry is operated in this manner, there will be essentially no drift in the amplification stage of the circuit.

The relay 164 is connected by mechanical linkage 166 to the movable arm of switch 62 in the same manner as has been described with respect to the relay 53 shown in FIGURE 2. The set-point control device 71, which includes the voltage divider 72 and battery 74, is identical in its construction and operation to the set-point control device previously described. The contact A of switch 62 is connected by electrical conductor 65 to the reference electrode 22, and the output from the set-point control device 71 is connected by conductor 167 to the control amplifier 68 and reset amplifier 70 (as better illustrated in the FIGURE 2 embodiment).

The principle of operation of the embodiment of the invention illustrated in FIGURE 4 is somewhat similar to the principle of operation of the embodiment illustrated in FIGURE 2, except, as previously indicated, greater stability of operation is obtained using the circuitry of FIGURE 4. Initially, changes in the potential difference existing between the sampling electrodes 30 and 32 result in a change in the amplitude of the pulsating DC signal developed by the chopper converter 148. Accordingly, the change is also reflected in the square wave AC signal introduced to the AC amplifier 150. When the magnitude of change of this signal is sufficiently great (according to the predetermined properties of the amplifier), the amplifier develops an amplified output signal which is reconverted to a DC signal which is in direct phase relationship with the input signal to the AC amplifier 150. This demodulation is accomplished by the chopper converter 154 which, as has been indicated, is mechanically ganged to the chopper type converter 148.

The signal from the chopper converter 154 is amplified by the triode amplifier 162 and is passed through the coil of the relay 164. With proper adjustment of the sensitivity of the relay 164, the relay may be energized upon the development of a sufficient degree of change in the potential difference between sampling electrodes 30 and 32 to throw the switch 62 from its normal position, in which two if its contacts are closed, to its second position, in which a different pair of contacts are closed. In this way, either of two desired set-points may be automatically set into the control system in accordance with a change in the physical or chemical environment of the sampling electrodes 30 and 32, and therefore of the metallic vessel 10.

Figure 5:
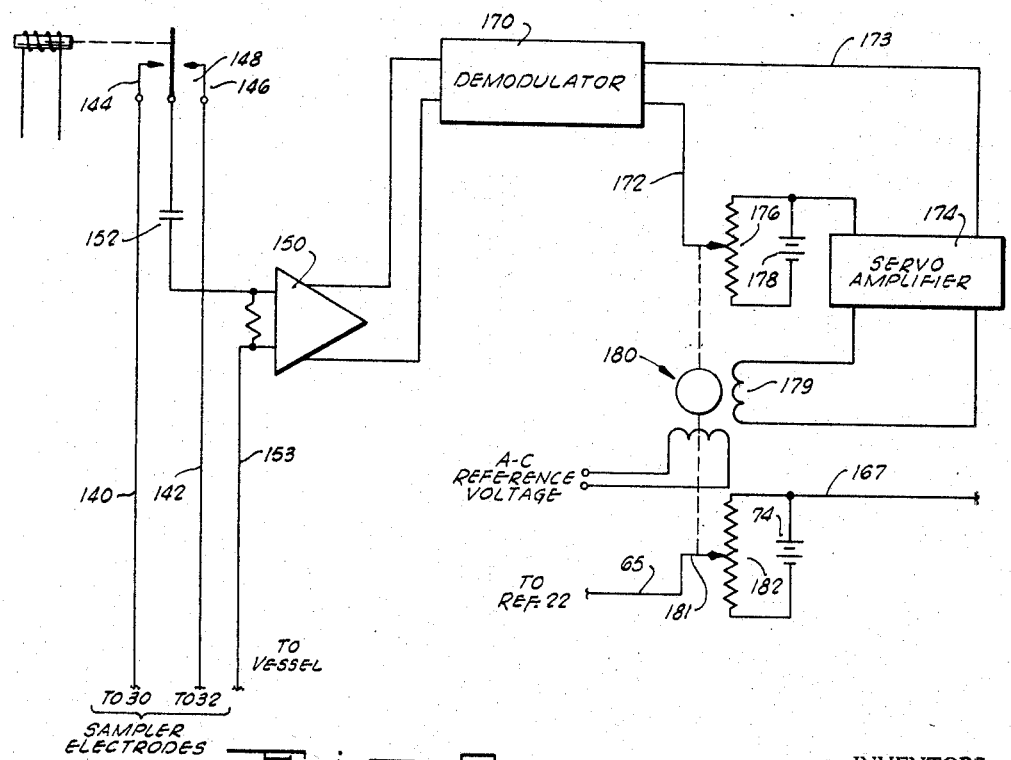
FIGURE 5 is a schematic wiring diagram of a third embodiment of the present invention.

Yet another embodiment of the invention is illustrated in FIGURE 5. The system illustrated in FIGURE 5 differs from that which is illustrated in FIGURES 2 and 4 in that the control potential $V_c$ or set-point of the anodic polarization corrosion control system can be adjusted proportionately and continuously according to the development of a changing potential difference between sampling electrodes 30 and 32. The embodiment illustrated in FIGURE 5 thus finds application where the concentration of the electrolyte, its temperature or its state of purity causes the electrical potential of the metallic vessel 10 to undergo a gradual change, thus requiring a gradual and continual change in the current passed between the vessel and the inert cathode 14 in order to maintain the vessel in a passive state.

The sampling electrodes 30 and 32, of course, also respond to such gradual changes in their chemical or physical environment by developing between them a gradually changing potential difference. As described with respect to FIGURE 4, the electrodes 30 and 32 are connected by conductors 140 and 142 to a chopper type converter 148 having stationary arms 144 and 146. The resulting pulsating DC signal is passed through a capacitor 152 to convert the signal to a square wave AC signal which is applied to the AC amplifier 150. The output from the amplifier 150 is demodulated by a demodulating device 170 which may be of the type described in detail during the discussion of FIGURE 4.

The output from the demodulator 170 is applied to electrical conductors 172 and 173 which are connected to a servo amplifier 174 through a potentiometer 176 and stable DC source or battery 178. The output from the servo amplifier 174 is applied to the balance or control winding 179 of a two-phase servo motor 180. The potentiometer 176, battery 178, servo amplifier 174, and motor 180 constitute a self-balancing type servo system.

As the DC voltage from the demodulator 170 changes in response to changes in the potential difference between the sampling electrodes 30 and 32, the servo system amplifies the changes, causing the servo motor 180 to reposition the potentiometer 176 which, in changing, turns in sufficient voltage from the battery 178 to "buck" or cancel out the change in the DC level from the demodulator 170 and return the input of the servo amplifier 174 to zero or some other predetermined point. The motor 180 is mechanically ganged to the movable tap 181 of a second potentiometer 182. If the potentiometer 182 is then incorporated in the set-point control device 71 in place of the voltage divider 72 and switch 62 illustrated in FIGURES 2 and 4, the control potential $V_c$ of the anodic polarization corrosion control system will be continuously and proportionately adjusted according to the changes occurring in the potential difference between the sampling electrodes 30 and 32.

It should be noted that the potentiometer 182 may be made logarithmic, parabolic, or have its resistance versus shaft rotation follow any curve physically possible to construct, thus making it possible to follow almost any curve of potential difference between the sampling electrodes 30 and 32 as a function of chemical and physical variables which may affect the potential of the metallic vessel 10. It should also be noted that the change from one condition determining the vessel potential to a condition resulting in a change in such vessel potential need not be gradual to enable useful application of the system illustrated in FIGURE 5. This system can be used where many different and discrete solutions are placed at different times in one vessel, such as may be the case in a batch operation. The only requirement for the use of the system is that the DC potential difference developed between sampling electrodes 30 and 32 be cataloged prior to the use of the system, and properly related to the corresponding position of the potentiometer 182 which is required to provide the correct set-point or control potential $V_c$ for the anodic polarization control system.

From the foregoing description of the invention, it will be apparent that the present invention provides a highly useful system for automatically adjusting the control potential $V_c$ which is required in the proper usage of an anodic polarization corrosion control system in order to maintain a metallic specimen in a passive state of maximum resistance to corrosion. The system of the invention is relatively simple in construction, is characterized by a high degree of electrical stability and possesses a long and trouble-free service life. Through the use of the system, the need for additional operator supervision of conventional anodic polarization control systems is obviated, and the chemical or physical environment of a metallic specimen which is to be protected may be changed without discontinuity or interruption in effective corrosion control.

Although several specific embodiments of the present invention have been hereinbefore illustrated and have been described in detail, it is to be understood that additional systems of slightly different electrical construction can be employed to accomplish substantially the same result without departing from the basic principles which underlie the present invention. Therefore, insofar as changes and modifications which may be made in the system hereinbefore described do not entail a departure or abandonment of the basic principles which underlie this invention, such changes and innovations are considered to be circumscribed by the spirit and scope of the present invention except as the same may be necessarily limited by the appended claims or reasonable equivalents thereof.

We claim:

1. A method for protecting a metallic specimen against corrosion by a corrosive electrolyte in contact with said specimen which comprises:

anodically polarizing the specimen relative to an inert electrode placed in contact with said electrolyte;

measuring the electrical potential of the metallic specimen relative to a reference electrical potential of constant value;

passing an electrical current between said inert electrode and said metallic specimen;

varying the electrical current passed between said inert electrode and said metallic specimen in response to changes in the measured electrical potential of said metallic specimen so as to maintain said electrical potential at a value at which said metallic specimen is least susceptible to corrosion;

electrolytically sensing changes in the character of said electrolyte of the type causing a change in said electrical potential at which said specimen is least susceptible to corrosion; and automatically varying the electrical current passed between said inert electrode and metallic specimen in response to said sensed changes to maintain said metallic specimen in a range over which said specimen is least susceptible to corrosion after said sensed change in the character of the electrolyte occurs.

2. In a method of reducing the susceptibility of a metallic specimen to corrosive attack by an electrolyte in contact therewith, which method includes the steps of anodically polarizing the specimen relative to an inert electrode in the electrolyte, measuring the electrical potential of the specimen relative to a reference electrode, passing an electrical current between said inert electrode and said specimen, varying the electrical current passed in response to changes in the measured electrical potential of said metallic specimen so as to maintain said electrical potential at a value at which said metallic specimen has minimum susceptibility to corrosion, the improvement which comprises:

continuously and electrolytically sensing changes in the properties of said electrolyte which would change the electrical potential of said specimen at which the specimen has minimum susceptibility to corrosive attack; then in response to the sensed changes in said electrolyte properties, automatically varying the electrical current passed between the specimen and the inert electrode to maintain the passivity of the specimen despite said changes in the properties of the electrolyte.

3. A method for protecting a metallic specimen against corrosion by a corrosive electrolyte in contact therewith comprising:

placing an inert electrode in contact with said electrolyte;

placing a reference electrode of constant electrical potential in electrical communication with said electrolyte;

passing an electrical current between said inert electrode and said specimen while said specimen is anodically polarized relative to said inert electrode;

continuously measuring the potential difference between said reference electrode and said metallic specimen;

continuously comparing said measured potential difference with a predetermined potential difference which is equal the potential difference between said specimen and said reference electrode when said vessel is least susceptible to corrosion by contact with said electrolyte;

responsive to said continuous comparison, adjusting the magnitude of current passed between said specimen and said inert electrode to cause said measured potential difference to approach and tend to equal said predetermined potential difference;

placing two other electrodes in electrical communication with said electrolyte, said electrodes each having a single constant electrical potential relative to each other when said electrolyte remains chemically and physically unchanged and having a predictably different electrical potential relative to each other when at least one property of said electrolyte changes;

continuously monitoring the potential difference between said two other electrodes to sense changes in said potential difference when at least said one property of said electrolyte changes; and in response to sensed changes in the potential difference between said two other electrodes, automatically changing said predetermined potential difference to a new predetermined potential difference with which said measured potential difference is continuously compared; and adjusting the magnitude of the current passed between said specimen and said inert electrode to cause said measured potential difference to approach and tend to equal said new predetermined potential difference.

4. A system for minimizing corrosion of a metallic specimen by an electrolyte in contact therewith comprising:

an inert electrode in the electrolyte;

a source of direct current energy connected to the specimen and electrode to make the specimen anodic relative to the electrode and for passing an electrical current therebetween;

a reference electrode in electrical communication with said electrolyte, said reference electrode having a substantially constant electrical potential when said electrolyte remains substantially unchanged chemically and physically;

potential control means connected to said specimen, said reference electrode and said source of direct current energy for sensing variations in the potential difference between said reference electrode and said specimen and adjusting the output of said direct current energy source to maintain said metallic specimen in a state of minimum susceptibility to corrosion, said potential control means including a set-point control device for matching said potential difference between said specimen and said reference electrode with a preselected potential difference equal to the potential difference between said specimen and said reference electrode when said specimen is in a state of minimum susceptibility to corrosion;

electrolytic means sensing a change in at least one of the properties of said electrolyte which would change the said preselected potential difference to a new value; and means for automatically adjusting said set-point control device to change said preselected potential difference to the new value in response to said sensed change.

5. A system as claimed in claim 4 wherein said set-point control device comprises:

a source of E.M.F. developing said preselected potential difference; and, electrical conductors connecting said specimen and said reference electrode to said source of E.M.F. so that said preselected potential difference bucks the potential difference developed between said specimen and said reference electrode to develop an error signal equal to the difference between said preselected potential difference and the potential difference between said specimen and said reference electrode.

6. A system as claimed in claim 4 wherein said electrolytic sensing means comprises:

two electrodes each having a substantially constant electrical potential when said electrolyte remains substantially unchanged chemically and physically, and said two electrodes each being further characterized in changing in electrical potential at a different rate from the other electrode when said one property of the electrolyte undergoes change; and means for detecting changes in the potential difference between two of said electrodes occasioned by said change in at least one of the properties of said electrolyte.

7. A system as claimed in claim 6 wherein the means for automatically adjusting said set-point control device comprises: means responsive to said detection of changes in the potential difference between said two electrodes for changing said preselected potential difference to the new value.

8. A system as claimed in claim 7 wherein said means for detecting changes in the potential difference between said two electrodes comprises:

a chopper converter having its stationary contacts each connected to one of said two electrodes for producing a first pulsating direct current signal having an amplitude proportional to the potential difference between said two electrodes;

means responsive to said pulsating direct current signal for producing an amplified alternating current signal when the potential difference between said two electrodes varies by a predetermined amount; and, means for demodulating said amplified alternating current signal to produce an amplified direct current signal.

9. A system as claimed in claim 8 wherein said means responsive to said detection of changes comprises relay means actuated by said amplified direct current sginal; and, switch means actuated by said relay means and adapted to alternately connect two sources of different predetermined potential differences into said set-point control device.

10. A system as claimed in claim 8 wherein said means responsive to said detection of changes comprises:

a self-balancing servo system connected to said demodulating means and responsive to the amplified direct current signal therefrom for continuously developing a mechanical motion during the period that the potential difference between said two electrodes changes; and, a potentiometer mechanically connected to said self-balancing servo system and responsive to said mechanical motion to develop an electrical potential difference substantially equal to the potential difference which will exist between said specimen and said inert electrode when at least one of the properties of said electrolyte are changed to cause said change in the potential difference between said two electrodes, and when said metallic specimen is in its state of least susceptibility to corrosion by the electrolyte.

11. A system as claimed in claim 7 wherein said means for detecting changes in the potential difference between said two electrodes comprises a direct current differential amplifier having a pair of triodes with said two electrodes each connected to the grid of one of said triodes whereby an amplified direct current signal is developed by said differential amplifier when the potential difference between said two electrodes changes.

12. A system as claimed in claim 11 wherein said means responsive to said detection of changes comprises:
a relay energized by the amplified direct current signal developed by said differential amplifier; and,
switch means actuated by said relay and adapted to alternately connect two sources of different predetermined potential differences into said set-point control device.

13. A system for minimizing corrosion of a metallic specimen by an electrolyte in contact therewith comprising:
an inert electrode in the electrolyte;
a source of direct current energy connected to the specimen as the anode and the inert electrode as the cathode for passing an electrical current therebetween; and,
control means for automatically controlling the current from said source passed between said inert electrode and said specimen to maintain said specimen in a state of minimum susceptibility to corrosion both before and after at least one of the properties of said electrolyte which affect its corrosivity relative to said metal specimen is changed comprising:
(a) first electrolytic means continuously developing a first electrical potential difference indicative of the susceptibility to corrosion of said metallic specimen;
(b) means responsive to said first potential difference developing means for producing a control signal controlling the output of current from said source of direct current energy;
(c) second electrolytic means continuously developing a second electrical potential difference indicative of the chemical and physical state of said electrolyte; and,
(d) means responsive to said second potential difference developing means for changing said control signal when one of the chemical and physical properties of said electrolyte changes whereby said specimen can be maintained in a state of minimum susceptibility to corrosion despite changes in the physical and chemical properties of said electrolyte.

References Cited

Sudbury et al.: "Corrosion," vol. 16, No. 2, February 1960, pp. 47t–54t.

HOWARD S. WILLIAMS, *Primary Examiner.*

T. H. TUNG, *Assistant Examiner.*